(12) United States Patent
Blanton et al.

(10) Patent No.: US 10,247,430 B2
(45) Date of Patent: Apr. 2, 2019

(54) HVAC UNIT WITH HOT GAS REHEAT

(71) Applicant: Johnson Controls Technology Company, Plymouth, MI (US)

(72) Inventors: Norman J. Blanton, Norman, OK (US); Stephen C. Wilson, Oklahoma City, OK (US); Stephen B. Pickle, Norman, OK (US)

(73) Assignee: Johnson Controls Technology Company, Auburn Hills, MI (US)

( * ) Notice: Subject to any disclaimer, the term of this patent is extended or adjusted under 35 U.S.C. 154(b) by 205 days.

(21) Appl. No.: 15/291,975

(22) Filed: Oct. 12, 2016

(65) Prior Publication Data

US 2017/0030600 A1 Feb. 2, 2017

Related U.S. Application Data

(60) Continuation of application No. 15/089,122, filed on Apr. 1, 2016, which is a division of application No. (Continued)

(51) Int. Cl.
*F24F 1/00* (2011.01)
*F24F 3/153* (2006.01)
(Continued)

(52) U.S. Cl.
CPC .............. *F24F 3/153* (2013.01); *F24F 3/044* (2013.01); *F24F 11/30* (2018.01); *F24F 11/77* (2018.01); *F24F 13/20* (2013.01); *F25B 5/02* (2013.01); *F25B 7/00* (2013.01); *F25B 41/04* (2013.01); *F25B 47/022* (2013.01); *F25D 17/06* (2013.01); *F24F 11/61* (2018.01); *F24F 11/63* (2018.01); *F24F 11/64* (2018.01); *F24F 11/65* (2018.01);
(Continued)

(58) Field of Classification Search
CPC ........ F24F 3/044; F24F 2110/20; F24F 3/153; F24F 2221/54; F25B 5/02; F25B 47/022; F25B 7/00; F25B 41/04; F25B 2600/0271
See application file for complete search history.

(56) References Cited

U.S. PATENT DOCUMENTS

| | | |
|---|---|---|
| 2,770,100 A | 11/1956 | Raney |
| 2,961,844 A | 11/1960 | McGrath |

(Continued)

FOREIGN PATENT DOCUMENTS

| | | |
|---|---|---|
| WO | WO-1993010411 | 5/1993 |
| WO | WO-2008153669 | 12/2008 |
| WO | WO-2010039386 | 4/2010 |

*Primary Examiner* — Ana M Vazquez
(74) *Attorney, Agent, or Firm* — Fletcher Yoder, P.C.

(57) ABSTRACT

The present disclosure is directed to a single compressor HVAC system with hot gas reheat. The system includes a single compressor, a pair of condensers, a reheat heat exchanger, an evaporator, and an expansion device. Within the system, the refrigerant exiting the compressor is separated into two portions. In the cooling mode, the first and second portions of the refrigerant are directed from the compressor through the two condensers in parallel. In the reheat mode, the first portion of the refrigerant is directed through the first condenser, while the second portion of the refrigerant is directed through the reheat heat exchanger. The system also may include a head pressure control device that is designed to maintain the compressor discharge pressure within a desired range by adjusting the condenser fan speed.

20 Claims, 5 Drawing Sheets

Related U.S. Application Data

13/370,098, filed on Feb. 9, 2012, now Pat. No. 9,322,581.

(60) Provisional application No. 61/441,964, filed on Feb. 11, 2011.

(51) Int. Cl.

| | | |
|---|---|---|
| *F25B 5/02* | (2006.01) |
| *F25B 41/04* | (2006.01) |
| *F25B 47/02* | (2006.01) |
| *F24F 3/044* | (2006.01) |
| *F25B 7/00* | (2006.01) |
| *F25D 17/06* | (2006.01) |
| *F24F 13/20* | (2006.01) |
| *F24F 11/30* | (2018.01) |
| *F24F 11/77* | (2018.01) |
| *F24F 110/10* | (2018.01) |
| *F24F 110/20* | (2018.01) |
| *F24F 140/12* | (2018.01) |
| *F24F 11/63* | (2018.01) |
| *F24F 11/64* | (2018.01) |
| *F24F 11/65* | (2018.01) |
| *F24F 11/61* | (2018.01) |
| *F24F 11/84* | (2018.01) |

(52) U.S. Cl.
CPC ....... *F24F 11/84* (2018.01); *F24F 2001/0066* (2013.01); *F24F 2001/0077* (2013.01); *F24F 2110/10* (2018.01); *F24F 2110/20* (2018.01); *F24F 2140/12* (2018.01); *F24F 2221/183* (2013.01); *F24F 2221/54* (2013.01); *F25B 2600/0271* (2013.01); *F25B 2600/111* (2013.01); *Y02B 30/743* (2013.01)

(56) References Cited

U.S. PATENT DOCUMENTS

| | | |
|---|---|---|
| 3,105,366 A | 10/1963 | Atchison |
| 3,139,735 A | 7/1964 | Malkoff |
| 3,203,196 A | 8/1965 | Malkoff |
| 3,316,730 A | 5/1967 | Lauer |
| 3,631,686 A | 1/1972 | Kautz |
| 4,270,362 A | 6/1981 | Lancia |
| 4,271,678 A | 6/1981 | Liebert |
| 4,658,594 A | 4/1987 | Langford |
| 4,711,094 A | 12/1987 | Ares |
| 5,031,411 A | 7/1991 | Gehring |
| 5,062,276 A | 11/1991 | Dudley |
| 5,065,586 A | 11/1991 | Shapiro-Baruch |
| 5,088,295 A | 2/1992 | Shapiro-Baruch |
| 5,181,552 A | 1/1993 | Eiermann |
| 5,228,302 A | 7/1993 | Eiermann |
| 5,265,433 A | 11/1993 | Beckwith |
| 5,309,725 A | 5/1994 | Cayce |
| 5,333,470 A | 8/1994 | Dinh |
| 5,337,577 A | 8/1994 | Eiermann |
| 5,345,776 A | 9/1994 | Komazaki |
| 5,390,505 A | 2/1995 | Smith |
| 5,400,607 A | 3/1995 | Cayce |
| 5,448,897 A | 9/1995 | Dinh |
| 5,477,700 A | 12/1995 | Iio |
| 5,493,871 A | 2/1996 | Eiermann |
| 5,526,650 A | 6/1996 | Iritani |
| 5,598,715 A | 2/1997 | Edmisten |
| 5,598,887 A | 2/1997 | Ikeda |
| 5,622,057 A | 4/1997 | Bussjager |
| 5,634,348 A | 6/1997 | Ikeda |
| 5,651,258 A | 7/1997 | Harris |
| 5,666,813 A | 9/1997 | Brune |
| 5,706,664 A | 1/1998 | Hara |
| 5,752,389 A | 5/1998 | Harper |
| 5,915,473 A | 6/1999 | Ganesh |
| 6,055,818 A | 5/2000 | Valle |
| 6,059,016 A | 5/2000 | Rafalovich |
| 6,122,923 A | 9/2000 | Sullivan |
| 6,123,147 A | 9/2000 | Pittman |
| 6,131,653 A | 10/2000 | Larsson |
| 6,170,271 B1 | 1/2001 | Sullivan |
| 6,321,558 B1 | 11/2001 | Pruse |
| 6,355,091 B1 | 3/2002 | Felber |
| 6,381,970 B1 | 5/2002 | Eber |
| 6,385,985 B1 | 5/2002 | Bussjager |
| 6,386,281 B1 | 5/2002 | Ganesh |
| 6,427,454 B1 | 8/2002 | West |
| 6,427,461 B1 | 8/2002 | Whinery |
| 6,557,771 B2 | 5/2003 | Shah |
| 6,604,688 B2 | 8/2003 | Ganesh |
| 6,612,119 B2 | 9/2003 | Eber |
| 6,644,049 B2 | 11/2003 | Alford |
| 6,666,040 B1 | 12/2003 | Groenewold |
| 6,672,087 B1 | 1/2004 | Taras |
| 6,694,756 B1 | 2/2004 | Taras |
| 6,701,723 B1 | 3/2004 | Dobmeier |
| 6,705,093 B1 | 3/2004 | Taras |
| 6,751,967 B1 | 6/2004 | Chen |
| 6,826,921 B1 | 12/2004 | Uselton |
| 6,941,770 B1 | 9/2005 | Taras |
| 6,955,057 B2 | 10/2005 | Taras |
| 6,986,264 B1 | 1/2006 | Taras |
| 7,028,492 B2 | 4/2006 | Taras |
| 7,059,151 B2 | 6/2006 | Taras |
| 7,062,930 B2 | 6/2006 | Rayburn |
| 7,219,505 B2 | 5/2007 | Weber |
| 7,228,708 B2 | 6/2007 | Taras |
| 7,231,774 B2 | 6/2007 | Taras |
| 7,257,957 B2 | 8/2007 | Lifson |
| 7,272,948 B2 | 9/2007 | Taras |
| 7,275,384 B2 | 10/2007 | Taras |
| 7,287,394 B2 | 10/2007 | Taras |
| 7,290,399 B2 | 11/2007 | Taras |
| 7,325,414 B2 | 2/2008 | Taras |
| 7,434,415 B2 | 10/2008 | Knight |
| 7,469,555 B2 | 12/2008 | Taras |
| 7,523,623 B2 | 4/2009 | Taras |
| 7,559,207 B2 | 7/2009 | Knight et al. |
| 2004/0089015 A1 | 5/2004 | Knight |
| 2004/0144111 A1 | 7/2004 | Matsuoka |
| 2006/0130517 A1 | 6/2006 | Merkys et al. |
| 2008/0022705 A1 | 1/2008 | Clearman |
| 2008/0115515 A1 | 5/2008 | Bailey et al. |
| 2010/0191416 A1 | 7/2010 | Yamaguchi et al. |

HVAC UNIT WITH HOT GAS REHEAT

CROSS REFERENCE TO RELATED APPLICATIONS

This application is a continuation of U.S. patent application Ser. No. 15/089,122, entitled "HVAC UNIT WITH HOT GAS REHEAT," filed Apr. 1, 2016, which is a divisional of U.S. patent application Ser. No. 13/370,098, entitled "HVAC UNIT WITH HOT GAS REHEAT," filed Feb. 9, 2012, now U.S. Pat. No. 9,322,581 issued on Apr. 26, 2016, which claims priority from and the benefit of U.S. Provisional Application Ser. No. 61/441,964, entitled "HVAC UNIT WITH HOT GAS REHEAT," filed Feb. 11, 2011, which are hereby incorporated by reference.

BACKGROUND

The invention relates generally to heating, ventilating, and air conditioning systems (HVAC), and more particularly to HVAC systems employing hot gas reheat for humidity control.

A wide range of applications exists for HVAC systems. For example, residential, light commercial, commercial, and industrial systems are used to control temperatures and air quality in residences and buildings. Very generally, HVAC systems may include circulating a fluid, such as a refrigerant, through a closed loop between an evaporator where the fluid absorbs heat and a condenser where the fluid releases heat. The fluid flowing within the closed loop is generally formulated to undergo phase changes within the normal operating temperatures and pressures of the system so that considerable quantities of heat can be exchanged by virtue of the latent heat of vaporization of the fluid.

HVAC units, such as air handlers, heat pumps, and air conditioning units, are used to provide heated, cooled, and/or dehumidified air to conditioned environments. Dehumidification may be desired on days when the temperature is cool and there is a high humidity level, such as damp, rainy, spring and fall days. Further, certain spaces, such as refrigerator cases, locker rooms, food production lines, art galleries, and museums, may benefit from a low humidity environment. Accordingly, it may be desirable to operate an HVAC system in a reheat dehumidification mode.

In the reheat mode, humidity may be removed by cooling and then reheating air that is provided to the conditioned space. The air can be reheated using electric or gas heat; however, these heating methods may be costly. The air also can be reheated by passing the air over a reheat heat exchanger that circulates heated refrigerant from the closed loop of the HVAC system. However, when the refrigerant is circulated through the reheat heat exchanger, it may be difficult to maintain a consistent refrigerant charge level within the HVAC system. Further, additional equipment, such as a second compressor, may be desired when employing a reheat heat exchanger within a HVAC system.

DRAWINGS

DETAILED DESCRIPTION

Figure 1:
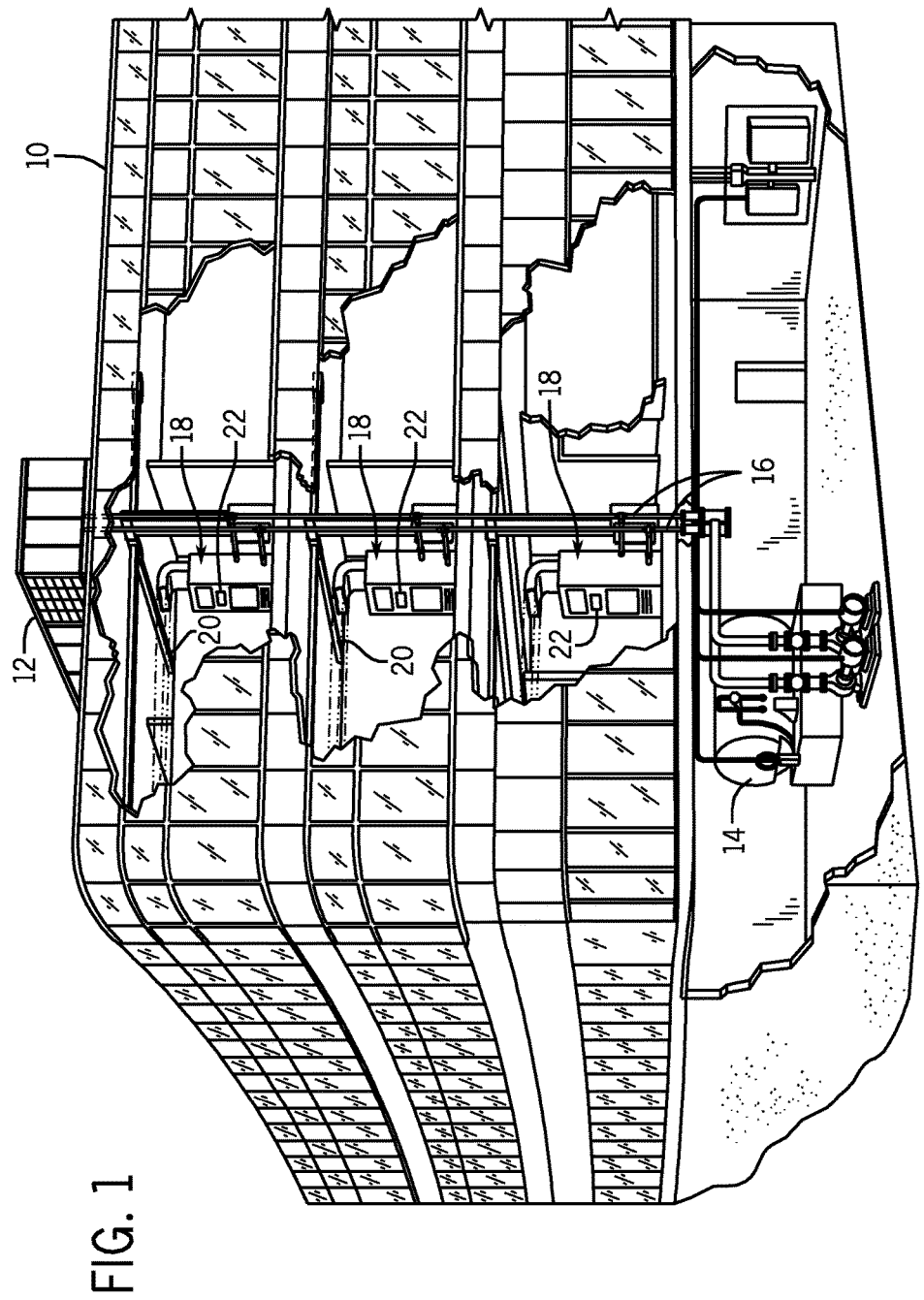
FIG. 1 is an illustration of an embodiment of a commercial or industrial HVAC system that employs a hot gas reheat system, in accordance with the present techniques.

The present disclosure is directed to an HVAC system that employs a novel hot gas reheat configuration to provide humidity control. The HVAC system includes a single compressor, at least two condensers, a reheat heat exchanger, an evaporator, and an expansion device. The HVAC system is designed to operate in a cooling mode, which provides cooled and dehumidified air to the conditioned space, and in a reheat mode that provides dehumidified air to the conditioned space when little or no sensible cooling is desired.

The HVAC system includes a closed refrigeration loop that circulates the refrigerant through the system. Within the system, the refrigerant exiting the compressor is separated into two portions. In the cooling mode, the first and second portions of the refrigerant are directed from the compressor through the two condensers in parallel. Approximately half of the refrigerant exiting the compressor is condensed in each condenser. However, in other embodiments, the amount of refrigerant condensed in each condenser may vary. The condensed refrigerant from the two condensers is then combined and directed through an expansion device and an evaporator to produce cooled air that is provided to the conditioned space. In the reheat mode, the first portion of the refrigerant is directed through the first condenser, while the second portion of the refrigerant is directed through the reheat heat exchanger to heat air cooled by the evaporator. The refrigerant flows through the reheat heat exchanger and the first condenser in parallel, and no refrigerant is directed through the second condenser. The refrigerant exiting the first condenser and the reheat heat exchanger is then combined and directed through the evaporator.

The second condenser, which is used in the cooling mode, and the reheat heat exchanger, which is used in the reheat mode, may have approximately equal interior volumes for receiving refrigerant. Accordingly, in both the cooling mode and the reheat mode, the refrigerant may be circulated within a closed refrigeration loop of approximately the same volume, which may allow the flow of refrigerant to be balanced in the HVAC system during both the cooling and reheat modes. However, in other embodiments, the relative volumes of the second condenser and the reheat heat exchanger may vary depending on factors such as system design characteristics and the amount of reheat that is desired, among others. Regardless of the relative volumes, a single compressor can be used in the HVAC system to provide both cooling and dehumidification control. In certain embodiments, the HVAC system also may include a head pressure control device that is designed to maintain the compressor discharge pressure within a desired range by adjusting the condenser fan speed. Maintaining the compressor discharge pressure may be particularly beneficial when the HVAC system is operating in the reheat mode to ensure that there is a sufficient flow of refrigerant through the reheat heat exchanger.

FIG. 1 illustrates an exemplary application, in this case a heating, ventilating, and air conditioning (HVAC) system for building environmental management that includes one or more HVAC units employing hot gas reheat. A building 10 is cooled, heated, and dehumidified by a system that includes an HVAC unit 12 and a boiler 14. As shown, HVAC unit 12 is disposed on the roof of building 10 and boiler 14 is located in the basement; however, the HVAC unit and boiler may be located in other equipment rooms or areas next to the building.

HVAC unit 12 is an air-cooled device that implements a refrigeration cycle to provide cooled and dehumidified air to building 10. HVAC unit 12 may be a stand-alone unit or may be part of a single package unit containing other equipment, such as a blower, integrated air handler, and/or auxiliary heating unit. In certain embodiments, the HVAC unit also may provide heating for the building. For example, in certain embodiments, the HVAC unit 12 may provide electric or gas heat. In these embodiments, the boiler may not be required. However, in other embodiments, the HVAC unit may provide cooling while the boiler provides heating.

Boiler 14 is a closed vessel that includes a furnace to heat water. The water from boiler 14 is circulated through building 10 by water conduits 16. Water conduits 16 are routed to air handlers 18, located on individual floors and within sections of building 10. Air handlers 18 include heat exchangers that circulate hot water from boiler 14 to provide heated air. Air handlers 18 also may provide the cooled air the from HVAC unit 12 to areas within building 10. Ductwork 20, coupled to air handlers 18, may receive air from an outside intake (not shown) and is adapted to distribute air between the air handlers. Fans, within air handlers 18, direct the conditioned air to environments within building 10, such as rooms, apartments, or offices, to maintain the environments at a designated temperature.

A control device, shown here as including a thermostat 22, may be used to designate the temperature of the conditioned air. Control device 22 also may be used to control the flow of air to and from air handlers 18. Other devices may, of course, be included in the system, such as control valves that regulate the flow of water and pressure and/or temperature transducers or switches that sense the temperatures and pressures of the water, the air, and so forth. Moreover, control devices may include computer systems that are integrated with or separate from other building control or monitoring systems, and even systems that are remote from the building.

Figure 2:
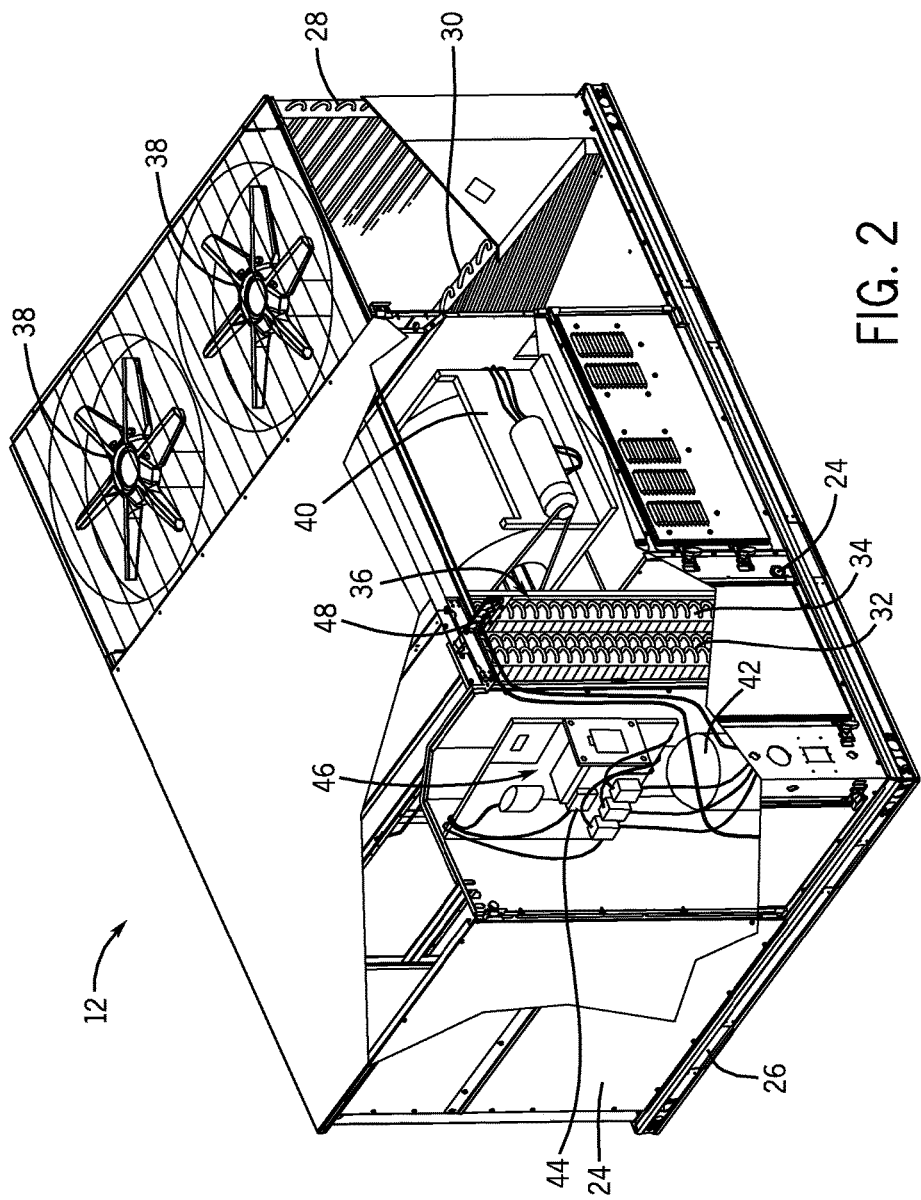
FIG. 2 is a perspective of the HVAC unit shown in FIG. 1 with a portion of the cabinet removed to reveal internal components.

FIG. 2 depicts HVAC unit 12, shown here as an air-conditioning package unit, with a portion of the external covering removed to show the internal components. As a single package unit, the HVAC unit may include an independent refrigeration circuit and components that are tested, charged, wired, piped, and ready for installation. Of course, in other embodiments, the HVAC unit may be a standalone unit that may be connected to one or more external refrigeration circuits and associated equipment. The HVAC unit may provide a variety of heating and/or cooling functions, such as cooling and dehumidification with reheat, or cooling and dehumidification with reheat and with electric or gas heat, among others.

A cabinet 24 encloses unit 12 to provide structural support and protect the internal components from environmental and other contaminants. According to certain embodiments, the cabinet may be constructed of galvanized steel and insulated with insulation. Of course, in other embodiments, the cabinet may be constructed of any suitable material. Rails 26 are adjoined to the bottom perimeter of cabinet 24 and provide a solid foundation for unit 12. In certain embodiments, the rails may provide access for a three-way forklift and overhead rigging.

HVAC unit 12 includes four heat exchangers, including condensers 28, 30, an evaporator 32, and a reheat heat exchanger 34, that are in fluid communication with the refrigeration circuit. Tubes within the heat exchangers may circulate refrigerant, such as R-410A, or any other suitable heat transfer fluid through the heat exchangers. The tubes may be of various types, such as multichannel tubes, conventional copper or aluminum tubing and fins, and so forth. Together, the heat exchangers may implement a thermal cycle in which the refrigerant undergoes phase changes and/or temperature changes as it flows through the heat exchangers to produce heated and/or cooled air. For example, condensers 28 and 30 may transfer heat from the refrigerant to ambient air to cool the refrigerant. In another example, evaporator 32 may absorb heat from an air stream to produce cooled air that can be provided to the conditioned space. When HVAC unit 12 is operating in the reheat mode, the cooled air from evaporator 32 may be directed over reheat heat exchanger 34 to heat the air to the desired temperature for the conditioned space.

Evaporator 32 and reheat heat exchanger 34 are located within a compartment 36 that separates evaporator 32 and reheat heat exchanger 34 from condensers 28 and 30. One or more fans 38 draw air from the environment through condensers 28 and 30. According to certain embodiments, condensers 28 and 30 may be separate and independent heat exchangers. However, in other embodiments, condensers 28 and 30 may be independent coils included within the same heat exchanger. As the ambient air flows across condensers 28 and 30, the ambient air absorbs heat from the refrigerant within the condensers 28 and 30 to condense the refrigerant. The heated ambient air is then released back to the environment.

The condensed refrigerant can then be provided to evaporator 32. A blower assembly 40 draws air through evaporator 32 and reheat heat exchanger 34 to provide cooled and/or dehumidified air to the conditioned space. In the cooling mode, reheat heat exchanger 34 is inactive and accordingly, the cooled air from evaporator 32 passes through reheat heat exchanger 34 without substantial heating or cooling. In the reheat mode, reheat heat exchanger 34 circulates high temperature refrigerant from a compressor 42. Accordingly, in the reheat mode, the cooled air from evaporator 32 can be heated as the air passes through reheat heat exchanger 34. The cooled and/or dehumidified air may be directed to the conditioned space by ductwork 20 (FIG. 1). Further, the high temperature refrigerant flowing through reheat heat exchanger 34 may be condensed as the refrigerant transfers heat to the cooled air from evaporator 32.

HVAC unit 12 also may include other equipment for implementing the thermal cycle. Compressor 42 reduces the volume available for the refrigerant, consequently, increasing the pressure and temperature of the refrigerant before the refrigerant enters condensers 28 and 30 and reheat heat exchanger 34. The compressor 42 may be any suitable type of compressor, such as a scroll compressor, screw compressor, centrifugal compressor, rotary compressor, or reciprocating compressor. As may be appreciated, additional equipment and devices may, of course, be included in the HVAC unit. For example, the unit may include one or more air filters, a filter drier, a drain pan, a disconnect switch, economizers, pressure switches, phase monitors, and humidity sensors, among others.

HVAC unit 12 may receive power through a terminal block 44. For example, a high voltage power source may be connected to terminal block 44 to power the equipment. The operation of unit 12 may be governed by a controller 46 that can include one or more control boards. According to certain embodiments, controller 46 may include a primary control board that governs general operation of HVAC unit 12 and a reheat control board that governs the reheat aspects of HVAC unit 12. Controller 46 may include control circuitry connected to a thermostat, humidistat, sensors, and/or alarms, among others. According to certain embodiments, controller 46 may be communicatively coupled to thermostat 22 (FIG. 1) to receive a desired temperature and/or humidity for the conditioned air. The controller 46 may be configured to control operation of the equipment, provide alarms, and monitor safety switches. Wiring 48 may connect control board 46 and terminal block 44 to the equipment of HVAC unit 12.

Figure 3:
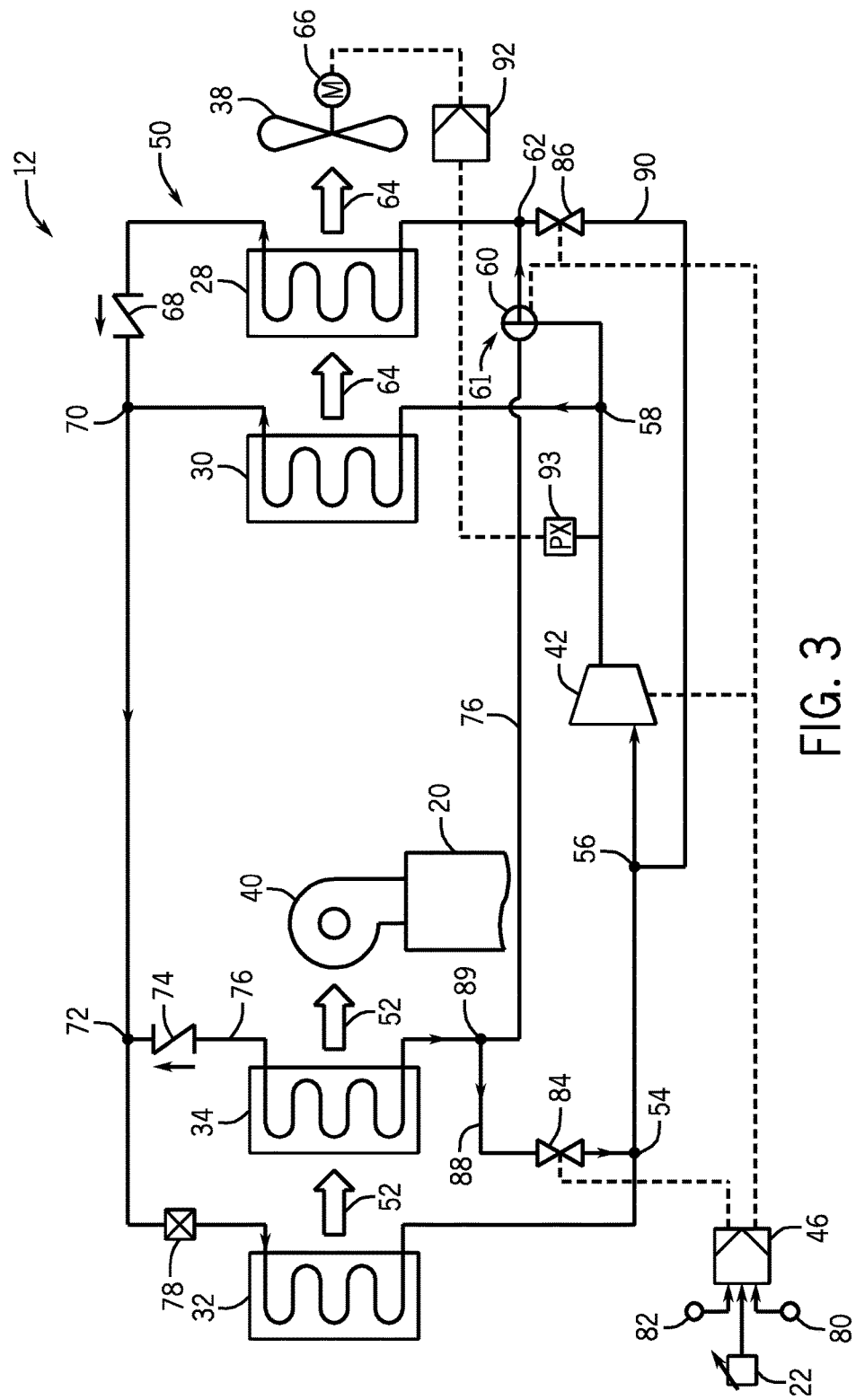
FIG. 3 is a schematic diagram of the HVAC unit shown in FIG. 1 operating in the cooling mode.
Figure 4:
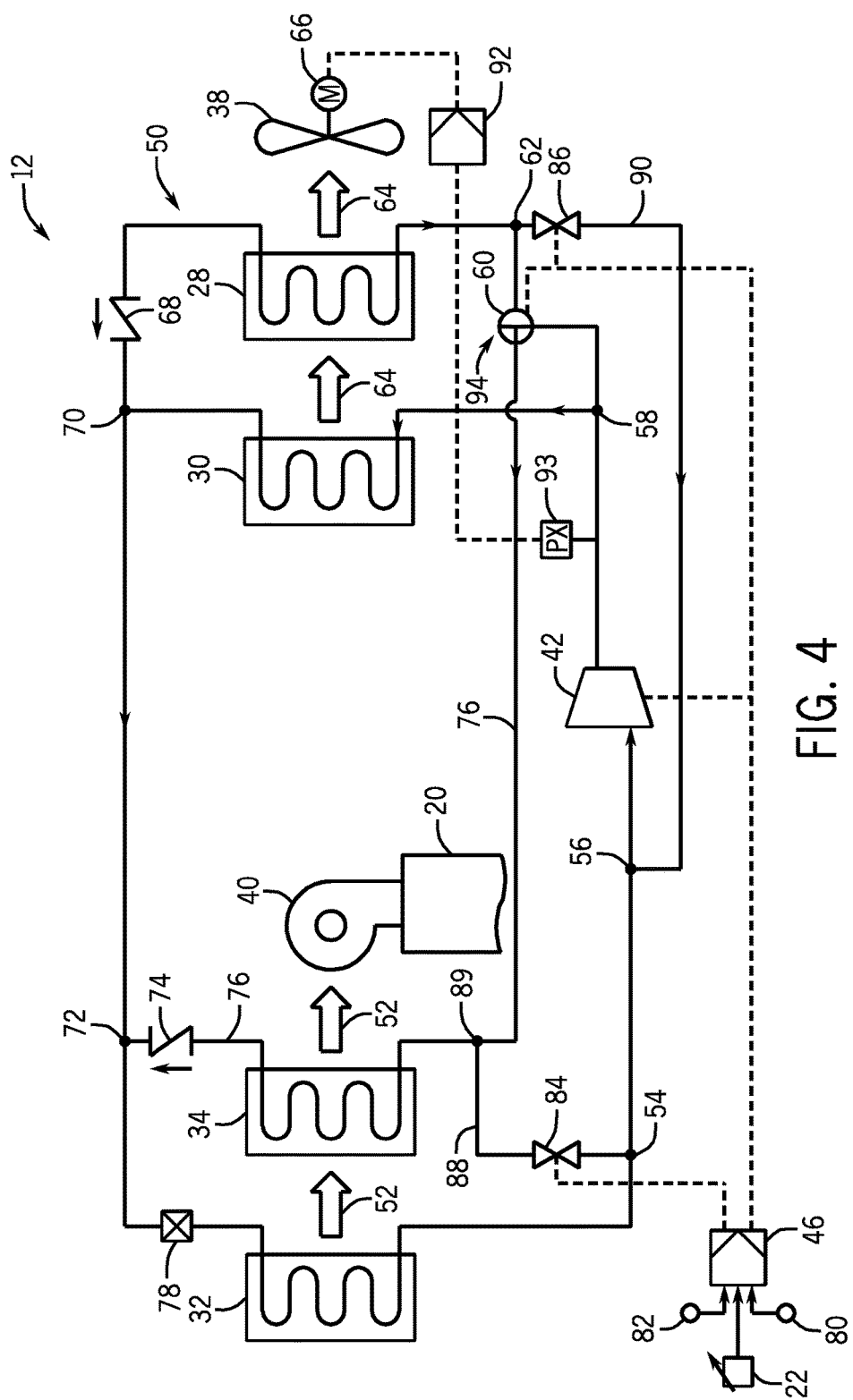
FIG. 4 is a schematic diagram of the HVAC unit shown in FIG. 1 operating in the reheat mode.

FIGS. 3 and 4 are schematic diagrams that depict the flow of refrigerant through HVAC unit 12. In particular, FIG. 3 shows HVAC unit 12 operating in a cooling mode, and FIG. 4 shows HVAC unit 12 operating in a reheat mode. The cooling mode can be employed to provide cooled air to a conditioned space, while the reheat mode can be employed to provide dehumidified air to the conditioned space when additional cooling of the air is not desired. For example, on days when the ambient temperature is relatively low and the humidity is high, the reheat mode may be employed to provide dehumidified air at a comfortable temperature.

As shown in FIG. 3, refrigerant flows through HVAC unit 12 within a closed refrigeration loop 50. In the cooling mode, refrigerant flows through evaporator 32, compressor 42, and condensers 28 and 30. Blower assembly 40 draws air 52, generally represented by arrows, through evaporator 32. As the air 52 flows across evaporator 32, the refrigerant flowing through evaporator 32 absorbs heat from the air to cool the air. The cooled air may then be provided to the conditioned space through ductwork 20. As the air is cooled, moisture also may be removed from the air to dehumidify the air. For example, as the air flows across heat exchanger tubes of evaporator 32, moisture within the air may condense on the tubes and may be directed to a drain.

Blower assembly 40 also may draw the air 52 across reheat heat exchanger 34, which is inactive in the cooling mode. Reheat heat exchanger 34 is disposed generally downstream of evaporator 32 with respect to the air flow, and accordingly, the cooled air exiting evaporator 32 may flow through reheat heat exchanger 34. However, in the cooling mode, reheat heat exchanger 34 contains little or no refrigerant, and accordingly, no substantial heating or cooling occurs as the air 52 flows through reheat heat exchanger in the cooling mode.

As the air 52 flows through evaporator 32, the air transfers heat to the refrigerant flowing within evaporator 32. As the refrigerant is heated, at least a portion of, or a large portion of, the refrigerant may evaporate into a vapor. The heated refrigerant exiting evaporator 32 then flows through connection points 54 and 56 to enter the suction side of compressor 42. Compressor 42 reduces the volume available for the refrigerant vapor, consequently, increasing the pressure and temperature of the refrigerant.

The refrigerant exits the discharge side of compressor 42 as a high pressure and temperature vapor that flows to a connection point 58. At connection point 58, the refrigerant is split into two separate portions. In particular, a first portion is directed to condenser 30, and a second portion is directed to a three-way valve 60. In the cooling mode, the three-way valve 60 is in the cooling position 61, which directs the refrigerant through connection point 62 to condenser 28. Three-way valve 60 is located downstream of connection point 58 and upstream of condenser 28, which ensures that condenser 30 receives a steady flow of refrigerant in both the cooling mode and the reheat mode.

In summary, in the cooling mode, the refrigerant is separated into two portions, with each portion flowing through a separate condenser 28 or 30 in parallel. According to certain embodiments, condensers 28 and 30 may be of approximately equal volume and/or size, allowing approximately half of the refrigerant by volume to be directed through each condenser 28 and 30. Further, the use of two separate condensers 28 and 30 in the cooling mode may be designed to maximize the surface area that is available for heat transfer in the cooling mode.

One or more fans 38, which are driven by one or more motors 66, draw air 64 across condensers 28 and 30 to cool the refrigerant flowing within condensers 28 and 30. According to certain embodiments, motor 66 may be controlled by a variable speed drive (VSD) or variable frequency drive (VFD) that can adjust the speed of the motor 66, and thereby adjust the speed of the fans 38. Fans 38 may push or pull air across heat exchanger tubes of condensers 28 and 30. As the air 64 flows across tubes of condensers 28 and 30, heat transfers from the refrigerant vapor to the air, producing heated air and causing the refrigerant vapor to condense into a liquid. The refrigerant exiting condenser 28 then flows through a check valve 68 to a connection point 70 where the refrigerant is combined with the refrigerant exiting condenser 30. The check valve 68 may be designed to allow unidirectional flow within the closed refrigeration loop 50 in the direction from condenser 28 to connection point 70. In other words, check valve 68 may impede the flow of refrigerant from connection point 70 into condenser 28.

The condensed refrigerant from condensers 28 and 30 may then flow through a connection point 72. In the cooling mode, a check valve 74 inhibits the flow of refrigerant from connection point 72 into a reheat circuit 76 that can be employed in the reheat mode to heat air exiting evaporator 32. Accordingly, the refrigerant flows from connection point 72 to an expansion device 78, where the refrigerant expands to become a low pressure and temperature liquid. In certain embodiments, some vapor also may be present after expansion in the expansion device. Expansion device 78 may be a thermal expansion valve (TXV); however, according to other embodiments, the expansion device may be an electromechanical valve, an orifice, or a capillary tube, among others. Further, in other embodiments, multiple expansion devices 78 may be employed. For example, in certain embodiments, the refrigerant exiting condenser 28 may be expanded in one expansion device, while the refrigerant exiting condenser 30 is expanded in another expansion device. In these embodiments, the refrigerant may be combined downstream of the expansion devices and upstream of evaporator 32. From expansion device 78, the refrigerant then enters evaporator 32, where the low temperature and pressure refrigerant may then again absorb heat from the air 52.

The operation of HVAC unit 12 can be governed by controller 46. Controller 46 can transmit control signals to compressor 42 (e.g., to a motor that drives the compressor) and to three-way valve 60 to regulate operation of HVAC unit 12. Although not shown, controller 46 also may be electrically coupled to blower assembly 40 and/or motor 66. Controller 46 can receive input from thermostat 22, and sensors 80 and 82, and may use information received from these devices to determine when to switch the HVAC unit 12 between the cooling mode and the reheat mode. Further, in other embodiments, the controller may receive inputs from local or remote command devices, computer systems and processors, and mechanical, electrical, and electromechanical devices that manually or automatically set a temperature and/or humidity related set point for the HVAC unit 12.

Sensors 80 and 82 can detect the temperature and the humidity, respectively, within the conditioned space and may provide data and/or control signals indicative of the temperature and humidity to controller 46. Controller 46 may then compare the temperature and/or humidity data received from sensors 80 and 82 to a set point received from thermostat 22. For example, the controller 46 may determine whether the sensed temperature is higher than a temperature set point. If the sensed temperature is higher than the set point, controller 46 may place the HVAC unit 12 in the cooling mode. In particular, the controller 46 may enable compressor 42 and place three-way valve 60 in the cooling position 61. In certain embodiments, controller 46 also may adjust operation of the blower assembly 40 and the motor 66. In another example, if the sensed temperature is below the temperature set point, controller 46 may then determine whether the sensed humidity is higher than a humidity set point. If the sensed humidity is higher than the set point, and the space does not require cooling, controller 46 may place the HVAC unit 12 in the reheat mode, as described further below with respect to FIG. 4.

The controller 46 may execute hardware or software control algorithms to govern operation of the HVAC unit 12. According to certain embodiments, the controller 46 may include an analog to digital (A/D) converter, a microprocessor, a non-volatile memory, and one or more interface boards. For example, in certain embodiments, the controller 46 can include a primary control board that receives control signals and/or data from controller 22 and temperature sensor 80. The primary control board may be employed to govern operation of the compressor 42, as well as other system components. The controller 46 also can include a reheat control board that receives data and/or control signals from humidity sensor 82. According to certain embodiments, sensor 82 may be a dehumidistat. The reheat control board may be employed to govern the position of three-way valve 60 and valves 84 and 86, as well as other system components. However, in other embodiments, the configuration of the controller 46 may vary. Further, other devices may, of course, be included in the system, such as additional pressure and/or temperature transducers or switches that sense temperatures and pressures of the refrigerant, the heat exchangers, the inlet and outlet air, and so forth.

According to certain embodiments, controller 46 may employ two different temperature set points to determine when to switch HVAC unit 12 between the reheat mode and the cooling mode. For example, controller 46 may use a first temperature set point to determine when to place HVAC unit 12 in the cooling mode when the humidity is low. If the sensed humidity is below the humidity set point, and the sensed temperature is above the first temperature set point, the controller 46 may operate HVAC unit 12 in the cooling mode. Controller 46 may use a second temperature set point to determine when to place HVAC unit in the cooling mode when the humidity is high. According to certain embodiments, the second temperature set point may be approximately 2 to 6 degrees higher than that the first temperature set point. If the sensed humidity is above the humidity set point and the temperature is above the second temperature set point, controller 46 may place HVAC unit 12 in the cooling mode. However, if the sensed humidity is above the humidity set point and the temperature is below the second temperature set point, controller 46 may operate the HVAC unit 12 in the reheat mode.

Controller 46 is also electrically coupled to valves 84 and 86 of refrigerant recovery circuits 88 and 90. Refrigerant recovery circuits 88 and 90 can be employed to recover refrigerant from reheat heat exchanger 34 and condenser 28, respectively, when switching between the cooling mode and the reheat mode. For example, when switching from the cooling mode to the reheat mode, controller 46 may open valve 86 to direct refrigerant from condenser 28 through connection point 62 and valve 86 to connection point 56 where the refrigerant may be directed to the suction side of compressor 42. When switching from the reheat mode to the cooling mode, controller 46 may open valve 84 to drain refrigerant from reheat heat exchanger 34 through connection point 89, and valve 84 to connection point 54 where the refrigerant may be directed to the suction side of compressor 42. Both recovery circuits 88 and 90 are connected to the suction side of compressor 42 to draw refrigerant from the refrigerant recovery circuits 88 and 90 back to the compressor 42.

According to certain embodiments, refrigerant recovery circuits 88 and 90 are designed to allow refrigerant from the inactive reheat heat exchanger 34 or condenser 28 to return to the compressor 42. The return of refrigerant to the compressor 42 may ensure that most, or all, of the refrigerant is circulated through the compressor 42 in both the cooling mode and the reheat mode. Accordingly, in the cooling mode shown in FIG. 3 (when three-way valve 60 is in cooling position 61), valve 84 may be open while valve 86 is closed. In the reheat mode shown in FIG. 4 (when three-way valve 60 is in reheat position 94) valve 86 may be open while valve 84 is closed.

Controller 46 may cycle valve 84 or 86 on and off or may leave valve 84 or 86 open to allow refrigerant from the inactive reheat heat exchanger 34 or condenser 28 to return to the compressor 42. For example, in certain embodiments, controller 46 may close valve 84 or 86 after a set amount of time. However, in other embodiments, controller 46 may leave valve 84 or 86 open until switching to the other mode of operation. For example, in these embodiments, controller 46 may close valve 84 when switching to the reheat mode, and may close valve 86 when switching to the cooling mode.

HVAC unit 12 also includes a control device 92 that may be employed to regulate pressure within closed refrigeration loop 50. According to certain embodiments, control device 92 may be designed to ensure that a minimum pressure differential is maintained across expansion device 78. Control device 92 is coupled to a pressure transducer 93 that detects the discharge pressure of the compressor 42. As shown, pressure transducer 93 is disposed in the closed refrigeration loop 50 between compressor 42 and connection point 58. However, in other embodiments, pressure transducer 93 may be disposed in other suitable locations on the high-pressure side of refrigeration loop 50. For example, the pressure transducer may be located between compressor 42 and three-way valve 60. In another example, the pressure transducer may be located between check valve 68 and expansion device 78 or between condenser coil 30 and expansion device 78. Further, in other other embodiments, any suitable type of pressure sensor may be used. For example, in certain embodiments, the pressure sensor may include one or more pressure switches and/or relays. Moreover, in certain embodiments, control device 92 may be integrated with controller 46.

Control device 92 may receive data indicative of the discharge pressure and may adjust the speed of the condenser fan motor 66 to maintain the pressure within a desired range. For example, control device 92 may transmit control signals to motor 66 to increase or decrease the fan speed. Further, in certain embodiments, control device 92 may include a VSD or VFD that adjusts the speed of motor 66. In the cooling mode, control device 92 may be employed at low ambient temperatures to ensure that an adequate pressure differential is maintained across expansion device 78. Control device 92 also may be employed to maintain sufficient flow of refrigerant through the reheat heat exchanger 34 when operating in the reheat mode, as discussed below with respect to FIG. 4.

FIG. 4 depicts HVAC unit 12 operating in the reheat mode. As discussed above, the reheat mode may be employed to provide dehumidification when additional cooling is not desired. For example, on days when the ambient temperature is low but the humidity is high, it may be desirable to provide dehumidified air that is not substantially reduced in temperature to avoid over cooling the space. High-pressure and temperature refrigerant exits compressor 42 and is directed to connection point 58 where the refrigerant is split into two portions. As in the cooling mode shown in FIG. 3, the first portion flows from connection point 58 to condenser 30. The second portion flows through three-way valve 60, which is now located in the reheat position 94 to direct the refrigerant into reheat circuit 76. Accordingly, in the reheat mode, no refrigerant is directed into the condenser 28. Further, valve 86 can be opened by controller 46 to drain refrigerant from condenser 28 to the suction side of compressor 42 through refrigerant recovery circuit 90.

Similar to the cooling mode, the first portion of refrigerant flows through condenser 30 and transfers heat to the air 64 to condense the refrigerant. The condensed refrigerant then exits condenser 30 and flows through connection points 70 and 72. Check valve 68 inhibits the flow of refrigerant from connection point 70 to condenser 28. Accordingly, the refrigerant exiting condenser 30 is directed through connection points 70 and 72 to expansion device 78.

The second portion of refrigerant flows through three-way valve 60 and into reheat circuit 76. Three-way valve 60 is located downstream of connection point 58 and upstream of condenser 28, which may ensure that there is sufficient flow of refrigerant through condenser 30 in the reheat mode. Within reheat circuit 76, the refrigerant, which is primarily vapor, flows through connection point 89 to reheat heat exchanger 34. As the refrigerant flows through reheat heat exchanger 34, the refrigerant transfers heat to the air 52 exiting the evaporator 32. In other words, the high temperature refrigerant flowing through reheat heat exchanger 34 heats the air exiting evaporator 32. Accordingly, in the reheat mode, the air 52 is first cooled and dehumidified as the air flows through evaporator 32. The cooled air is then reheated as the air 52 flows through reheat heat exchanger 34. Accordingly, the dehumidified air can be provided to the conditioned space through ductwork 20.

As the refrigerant flows through reheat heat exchanger 34, the refrigerant transfers heat to the air 52 and the refrigerant is condensed. According to certain embodiments, the refrigerant exiting reheat heat exchanger 34 may be condensed and/or subcooled. The refrigerant then flows through check valve 74 to connection point 72, where the refrigerant is combined with the condensed refrigerant exiting condenser 30. The refrigerant from connection point 72 is then directed through expansion device 78 and evaporator 32. From evaporator 32, the refrigerant returns to the compressor 42 where the process may begin again.

In summary, in the reheat mode, refrigerant from compressor 42 is separated into two separate portions that are directed through the condenser 30 and the reheat heat exchanger 34 in parallel, while condenser 28 is inactive. According to certain embodiments, condensers 28 and 30 and the reheat heat exchanger 34 may have approximately equal volumes. Accordingly, in the reheat mode, the refrigerant is circulated within a closed refrigeration loop of approximately the same volume as in the cooling mode, which may allow the flow of refrigerant to be balanced in the HVAC system during both the cooling and reheat modes. However, in other embodiments, the relative volumes of the condensers and the reheat heat exchanger may vary depending on factors such as system design characteristics and the amount of reheat desired, among others. In the reheat mode, refrigerant flows directly from compressor 42 to reheat heat exchanger 34 (without flowing through a condenser 28 or 30), which provides additional heating capacity for heating the air exiting evaporator 32 to the desired temperature. Moreover, substantially all the refrigerant exiting compressor 42 flows through evaporator 32, which provides additional capacity for dehumidification.

Control device 92 may be employed in the reheat mode and/or in the cooling mode to maintain the pressure within the closed refrigeration loop 50. According to certain embodiments, control device 92 may be a programmable device that allows a user, manufacturer, or field technician, to set a target pressure range for the compressor discharge pressure sensed by pressure transducer 93. The pressure range may vary depending on factors such as the type of refrigerant employed. Further, the target pressure range may vary depending on factors such as the application of the HVAC unit 12 and the environment in which the HVAC unit 12 is used, among others. The control device 92 may be employed in the cooling mode and/or in the reheat mode to maintain the compressor discharge pressure within the specified pressure range. Further, it may be beneficial to control the pressure when operating in the reheat mode to ensure that sufficient refrigerant flows through reheat heat exchanger 34 when ambient temperatures are low to ensure proper dehumidification. According to certain embodiments, control device 92 may be designed to regulate the pressure to maintain a near constant flow of refrigerant through reheat heat exchanger 34 as the ambient temperature changes. Further, in certain embodiments, the pressure range selected for control device 92 may be designed to maintain a minimum pressure differential across expansion device 78.

Figure 5:
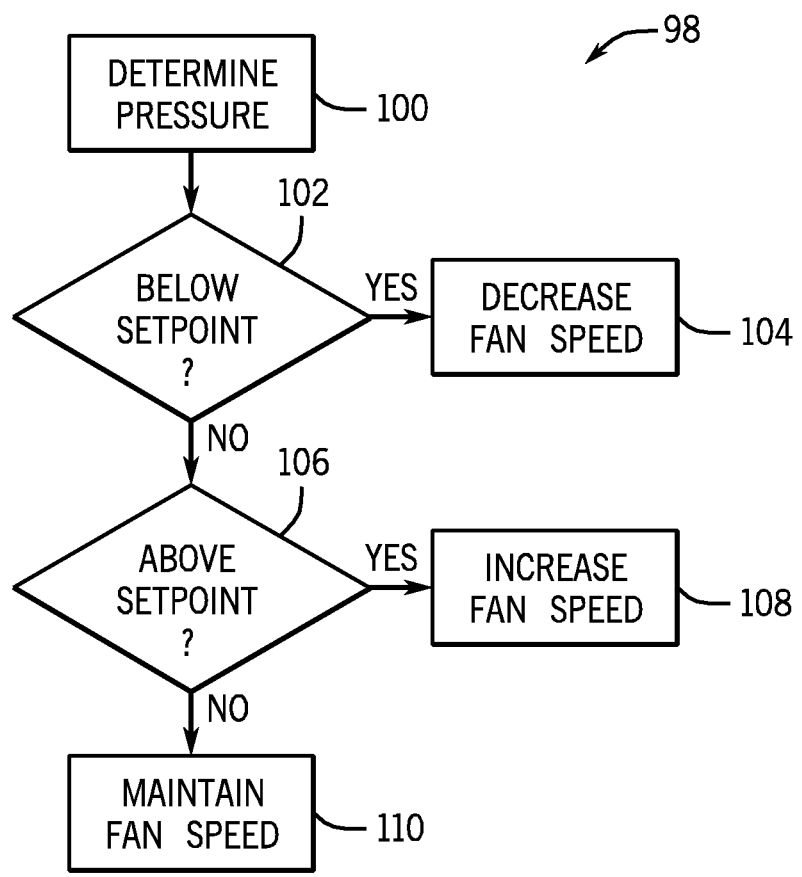
FIG. 5 is a flowchart depicting a method for regulating pressure when operating in the reheat mode.

FIG. 5 depicts a method 98 that may be employed to regulate the pressure within closed refrigeration loop 50 when HVAC unit 12 is operating in the reheat mode. The method 98 may begin by determining (block 100) the compressor discharge pressure. For example, pressure transducer 93 may detect the compressor discharge pressure and provide signals indicative of the pressure to control device 92. Control device 92 may then determine (block 102) whether the pressure is above or below the low-pressure set point. According to certain embodiments, control device 92 may include a storage that stores a low-pressure set point and a high-pressure set point, which define a target range of compressor discharge pressures. One or more hardware or software algorithms may be executed to determine whether the detected pressure is below the low-pressure set point.

If the pressure is below the low-pressure set point, control device 92 may then decrease (block 104) the fan speed. For example, control device 92 may send a control signal to motor 66 to decrease the rotational speed of fan 38. According to certain embodiments, control device 92 may be designed to linearly adjust the fan speed based on the detected pressure. Further, in certain embodiments, control device 92 may be designed to decrease (block 104) the fan speed to below approximately 200 revolutions per minute (RPMS). Decreasing the fan speed at low ambient temperatures may raise the temperature of the refrigerant flowing through condenser 30, which in turn, may increase the pressure within condenser 30 to promote the flow of refrigerant through reheat circuit 76 and reheat heat exchanger 34.

If the pressure is not below the low-pressure set point, control device 92 may then determine (block 106) whether the pressure is a above a high-pressure set point. For example, control device 92 may compare the detected pressure to the high-pressure set point. One or more hardware or software algorithms may be executed to determine whether the detected pressure is above the high-pressure set point. If the pressure is above the high-pressure set point, control device 92 may increase (block 108) the fan speed. For example, the control device 92 may send a control signal to motor 66 to increase the rotational speed of fan 38. If the pressure is not above the high-pressure set point, control device 92 may maintain (block 110) the present fan speed.

According to certain embodiments, control device 92 may be designed to continuously or periodically detect the pressure and adjust the fan speed based on the pressure to maintain the discharge pressure within the desired range. Further, in certain embodiments, adjustments may be made to the fan speed based on trends in the detected pressure. Moreover, in certain embodiments, control device 92 may be designed to iteratively adjust the fan speed based on the detected pressure to maintain a discharge pressure that is in approximately the middle of the desired pressure range.

While only certain features and embodiments of the invention have been illustrated and described, many modifications and changes may occur to those skilled in the art (e.g., variations in sizes, dimensions, structures, shapes and proportions of the various elements, values of parameters (e.g., temperatures, pressures, etc.), mounting arrangements, use of materials, orientations, etc.) without materially departing from the novel teachings and advantages of the subject matter recited in the claims. The order or sequence of any process or method steps may be varied or re-sequenced according to alternative embodiments. It is, therefore, to be understood that the appended claims are intended to cover all such modifications and changes as fall within the true spirit of the invention. Furthermore, in an effort to provide a concise description of the exemplary embodiments, all features of an actual implementation may not have been described (i.e., those unrelated to the presently contemplated best mode of carrying out the invention, or those unrelated to enabling the claimed invention). It should be appreciated that in the development of any such actual implementation, as in any engineering or design project, numerous implementation specific decisions may be made. Such a development effort might be complex and time consuming, but would nevertheless be a routine undertaking of design, fabrication, and manufacture for those of ordinary skill having the benefit of this disclosure, without undue experimentation.

The invention claimed is:

1. A heating, ventilating, or air conditioning system, comprising:
   a first refrigerant loop configured to circulate a first portion of refrigerant in a first operating mode and in a second operating mode;
   a first condenser of the first refrigerant loop configured to receive and to condense the first portion of the refrigerant in the first operating mode and the second operating mode;
   a second refrigerant loop configured to circulate a second portion of the refrigerant in the first operating mode but not in the second operating mode;
   a second condenser of the second refrigerant loop configured to receive and to condense the second portion of the refrigerant in the first operating mode but not in the second operating mode;
   a third refrigerant loop configured to circulate the second portion of the refrigerant in the second operating mode but not in the first operating mode; and
   a reheat heat exchanger of the third refrigerant loop configured to transfer heat from the second portion of the refrigerant to a conditioned space to condense the second portion of the refrigerant in the second operating mode but not in the first operating mode; and
   wherein the first portion of the refrigerant exiting the first condenser is configured to combine with the second portion of the refrigerant exiting the reheat heat exchanger in the second operating mode.

2. The heating, ventilating, or air conditioning system of claim 1, comprising an expansion device disposed along the first refrigerant loop, the second refrigerant loop, and the third refrigerant loop, wherein the first portion of the refrigerant exiting the first condenser is configured to combine with the second portion of the refrigerant exiting the second condenser prior to flowing through the expansion device in the first operating mode and the first portion of the refrigerant exiting the first condenser is configured to combine with the second portion of the refrigerant exiting the reheat heat exchanger prior to flowing through the expansion device in the second operating mode.

3. The heating, ventilating, or air conditioning system of claim 1, wherein the reheat heat exchanger and the first condenser each comprise approximately the same refrigerant volume or the first condenser comprises a refrigerant volume greater than the reheat heat exchanger.

4. The heating, ventilating, or air conditioning system of claim 1, wherein the first condenser and the second condenser each comprise approximately the same refrigerant volume or the first condenser comprises a refrigerant volume greater than the second condenser.

5. The heating, ventilating, or air conditioning system of claim 1, comprising a three-way valve configured to switch between a first position corresponding to the first operating mode and a second position corresponding to the second operating mode, wherein the three-way valve is configured to direct the first portion of the refrigerant into the first condenser and direct the second portion of the refrigerant into the second condenser when in the first position, and wherein the three-way valve is configured to direct the first portion of the refrigerant into the first condenser and direct the second portion of the refrigerant into the reheat heat exchanger when in the second position.

6. The heating, ventilating, or air conditioning system of claim 5, wherein the three-way valve is disposed along the first refrigerant loop downstream of an inlet to the first condenser and disposed along the second refrigerant loop upstream of the second condenser with respect to a flow of the refrigerant.

7. The heating, ventilating, or air conditioning system of claim 1, comprising a compressor configured to circulate the refrigerant through the first refrigerant loop, the second refrigerant loop, the third refrigerant loop, or any combination thereof.

8. The heating, ventilating, or air conditioning system of claim 7, comprising a refrigerant recovery circuit configured to drain the second portion of the refrigerant from the second condenser of the second refrigerant loop to the third refrigerant loop in the second operating mode.

9. The heating, ventilating, or air conditioning system of claim 7, comprising a refrigerant recovery circuit configured to drain the second portion of the refrigerant from the reheat heat exchanger of the third refrigerant loop to the second refrigerant loop in the first operating mode.

10. The heating, ventilating, or air conditioning system of claim 1, comprising a controller configured to switch the system between the first operating mode and the second operating mode based at least on first feedback received from a temperature sensor configured to measure a temperature of the conditioned space and second feedback received from a dehumidistat.

11. A system, comprising:
a compressor configured to circulate a refrigerant through a refrigerant circuit;
a first condenser disposed along the refrigerant circuit, wherein the first condenser is configured to receive and to condense a first portion of the refrigerant in a first operating mode and a second operating mode;
a second condenser disposed along the refrigerant circuit, wherein the second condenser is configured to receive and to condense a second portion of the refrigerant in the first operating mode but not in the second operating mode, wherein the first condenser and the second condenser are configured to operate in parallel with respect to a flow of the refrigerant in the first operating mode;
a reheat heat exchanger disposed along the refrigerant circuit, wherein the reheat heat exchanger is configured to transfer heat from the second portion of the compressed refrigerant to a conditioned space to condense the second portion of the refrigerant in the second operating mode but not in the first operating mode, wherein the first condenser and the reheat heat exchanger are configured to operate in parallel with respect to the flow of the refrigerant in the second operating mode; and
a three-way valve disposed along the refrigerant circuit, wherein the three-way valve is configured to direct the refrigerant from the compressor and through the first and second condensers during the first operating mode, and wherein the three-way valve is configured to direct the refrigerant from the compressor and through the first condenser and the reheat heat exchanger in the second operating mode.

12. The system of claim 11, comprising a refrigerant recovery circuit configured to drain the second portion of the refrigerant from the second condenser to an active refrigerant loop during the second operating mode, wherein the active refrigerant loop is configured to circulate the second portion of the refrigerant through the reheat heat exchanger and not through the second condenser.

13. The system of claim 11, comprising a refrigerant recovery circuit configured to drain the second portion of the refrigerant from the reheat heat exchanger to an active refrigerant loop during the first operating mode, wherein the active refrigerant loop is configured to circulate the second portion of the refrigerant through the second condenser and not through the reheat heat exchanger.

14. The system of claim 11, comprising an isolation device disposed downstream of the reheat heat exchanger, wherein the isolation device is configured to facilitate unidirectional flow of the second portion of the refrigerant from the reheat heat exchanger to the compressor and to block the flow of the second portion of the refrigerant to the reheat heat exchanger in the first operating mode.

15. The system of claim 11, comprising an isolation device disposed downstream of the second condenser and upstream of an outlet of the first condenser with respect to the flow of the refrigerant, wherein the isolation device is configured to facilitate unidirectional flow of the second portion of the refrigerant from the second condenser to the compressor and to block the flow of the second portion of the refrigerant to the second condenser in the second operating mode.

16. The system of claim 11, comprising a pressure control device configured to adjust a speed of one or more fans of the first condenser based on a discharge pressure of the refrigerant exiting the compressor.

17. A method, comprising:
circulating a refrigerant through a refrigerant circuit using a compressor;
directing a first portion of the refrigerant from the compressor toward a first condenser disposed along the refrigerant circuit in a first operating mode and in a second operating mode;
directing a second portion of the refrigerant from the compressor toward a second condenser disposed along the refrigerant circuit in the first operating mode but not in the second operating mode, wherein the first condenser and the second condenser are configured to operate in parallel with respect to a flow of the refrigerant in the first operating mode; and
directing the second portion of the refrigerant from the compressor toward a reheat heat exchanger disposed along the refrigerant circuit instead of toward the second condenser in the second operating mode but not in the first operating mode, wherein the first condenser and the reheat heat exchanger are configured to operate in parallel with respect to the flow of the refrigerant in the second operating mode.

18. The method of claim 17, comprising adjusting a position of a three-way valve disposed along the refrigerant circuit to switch between the first operating mode and the second operating mode.

19. The method of claim 18, wherein adjusting the position of the three-way valve disposed along the refrigerant circuit to switch between the first operating mode and the second operating mode comprises adjusting the position of the three-way valve based at least on a temperature of a conditioned space, a humidity level of the conditioned space, or both.

20. The method of claim 17, comprising measuring a pressure of the refrigerant exiting the compressor and adjusting a fan speed of the first condenser based on the pressure of the refrigerant exiting the compressor.

* * * * *